Sept. 30, 1952   J. A. MORRISON   2,612,232
SEAT CONTROLLED MECHANISM FOR THE CONTROL
OF THE OPERATION OF MOTOR VEHICLES
Filed Oct. 18, 1949   2 SHEETS—SHEET 1

INVENTOR.
JAMES A. MORRISON
BY
Merrill M. Blackburn.
ATTORNEY

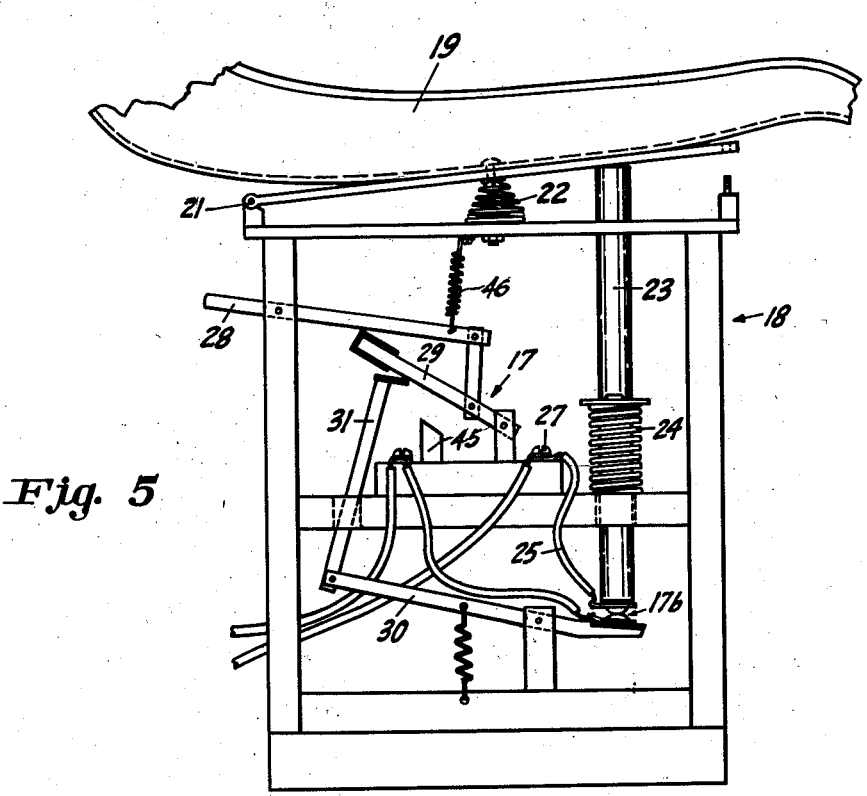
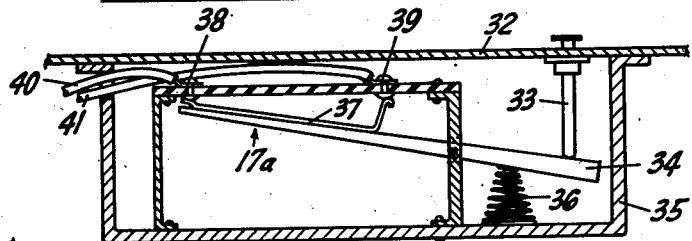
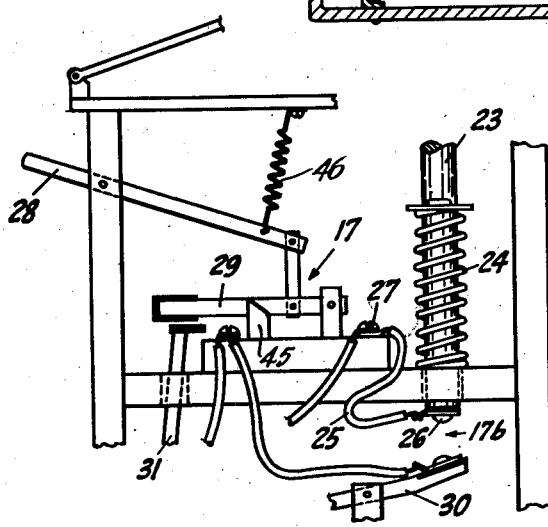
INVENTOR.
JAMES A. MORRISON
BY Merrill M. Blackburn
ATTORNEY Patented Sept. 30, 1952

2,612,232

UNITED STATES PATENT OFFICE 2,612,232

SEAT CONTROLLED MECHANISM FOR THE CONTROL OF THE OPERATION OF MOTOR VEHICLES

James A. Morrison, Washington, Iowa

Application October 18, 1949, Serial No. 121,951

3 Claims. (Cl. 180—82)

My present invention relates to the combined automatic and manual control of the functioning of a motor-drive vehicle, especially a tractor, although not necessarily limited thereto. Among the objects of this invention are the provision of mechanism which will ensure the stopping of a tractor if the driver falls from the seat thereof; the provision of a mechanism of the character described such that it will be possible to continue the operation of the vehicle when desired, even though the operator leaves his seat intentionally; the provision of a structure of the character described which may be caused to continue operation, even though the operator stands up on the machine and does not occupy the seat; and such further objects, advantages, and capabilities as will hereafter appear and as are inherent in the structure disclosed herein. My invention further resides in the combination, construction, and arrangement of parts illustrated in the accompanying drawings and, while I have shown therein a preferred embodiment of this invention, I desire the same to be understood as illustrative only and not as limiting my invention.

In the drawings annexed hereto and forming a part hereof,

Fig. 5 shows the structure of Fig. 3 with the parts in different positions of adjustment;

Fig. 6 shows another position of adjustment of the parts shown in Fig. 4; and

Fig. 7 shows parts of the structure shown in Figs. 3 and 5 in different positions of adjustment.

Figure 1:
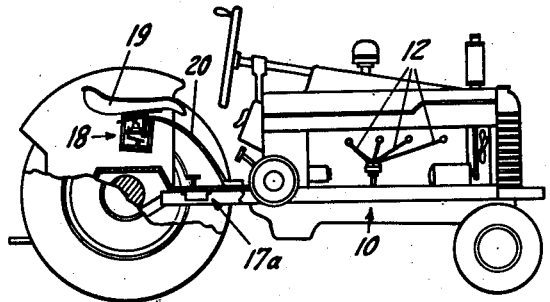
Fig. 1 shows a side elevation of a tractor with parts thereof removed.

Reference will now be made in greater detail to the annexed drawings for a more complete description of this invention. In Fig. 1 there is shown, in fragmentary side elevation, a tractor showing the location of the apparatus of this invention. The tractor is indicated, in general, by the numeral 10, and its spark plugs by the numeral 11. From these spark plugs, lead wires 12 which go to the timer or distributor 13. When a battery is used, the current is fed to a generator to cause operation thereof, and from this to a coil 16, from which secondary current passes to the distributor for distribution to the spark plugs. The secondary current from the coil 16 is a high potential for the production of a suitable spark in the spark plugs 11. According to my invention, this circuit may be broken in three different ways. Current flows from the generator 15 through the coil 16 where a current of higher potential is produced which may be fed through one or more suitable switches 17, 17a, and 17b. When one of these switches remains closed, the circuit from the coil to the distributor 13 is closed so that current may be fed to the spark plugs to cause ignition of the gas in the cylinders of the internal combustion engine.

Figure 3:
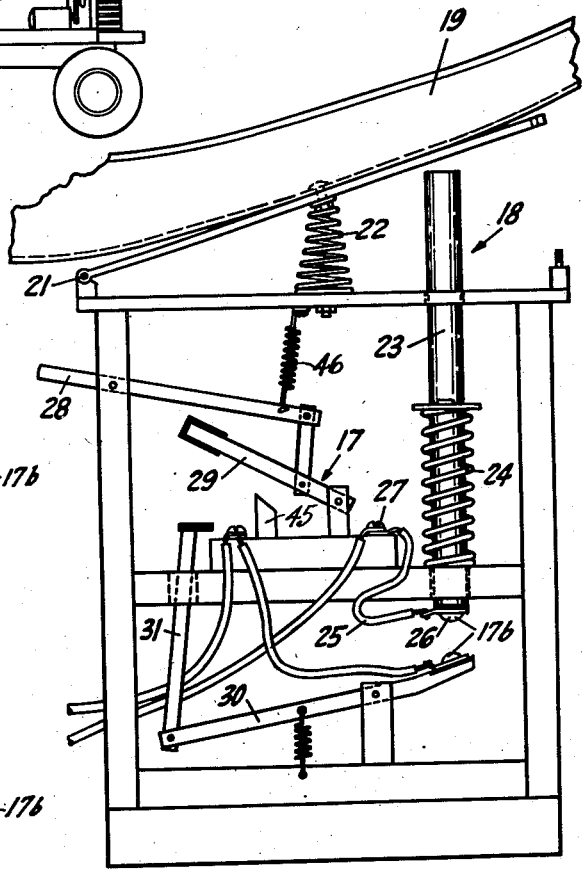
Fig. 3 represents somewhat diagrammatically a part of the wiring system and control switches therefor.
Figure 4:
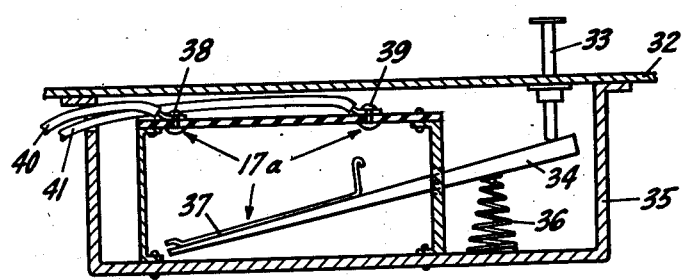
Fig. 4 shows in vertical section a mounting box for a switch used in this system and a container therefor.

The tractor seat 19 is carried by the spring 20 and has below it the assembly 18, shown in Figs. 3 and 5 as comprising the switches 17 and 17b, each of which comprises several parts. The seat 19 is pivotally connected at 21 to the assembly body 18 and, when not occupied, is raised by a spring 22 into elevated position, as shown in Fig. 3, relieving the pressure on the switch actuating plunger 23 which is raised by a spring 24. This separates the contacts of the switch 17b. A lead 25 connects the contacts 26 and 27 so that, when the switch 17b is closed, the circuit from coil 16 to the timer 13 will be completed and the spark plugs 11 will be activated. The switch 17b is actuated by the driver of the vehicle sitting on the seat 19. However, it is possible for the driver to have the motor run without sitting on the seat.

Consider the parts in the positions shown in Fig. 3. Now the driver may lift up on the exposed end of lever 28, which will result in the inner end of this lever going down and forcing a switch arm 29 to close the switch 17. With the switch 17 closed, there is a closed circuit between the coil 16 and the distributor 13, with the result that the spark plugs are activated and it is possible to run the motor. This enables the operator of the tractor to start his engine with a crank, if necessary. Now if the operator gets up on the tractor and sits on the seat, it will result in closing the switch 17b and opening the switch 17. Then, if the operator is thrown from or falls from the tractor, the opening of the switch 17b will result in stopping the engine.

If the switch 17 is closed and the operator sits on the seat 19, the lever 30 is turned about its pivot and forces the link 31 lengthwise, raising the switch blade 29 about its pivot and opening switch 17 so that there will be no switch closed, if the operator falls from his seat. The link 31 has a table at its upper end which engages and lifts the blade 29, if the link 31 is raised.

The weight of the inner end of the lever 28, together with the weight of the switch arm 29, would tend to move the latter into engagement with the contact 45 when the driver is off the seat 19, except for the light spring 46, which exerts enough tension to keep the parts in the position shown in Fig. 3, with the arm 29 and contact 45 separated. However, in the event that the operator wishes the motor to operate while the driver is off the seat, the operator manually lifts up on the outer end of the lever 28, as mentioned above, which moves the switch arm 29 downwardly into engagement with the contact 45. The engagement of these parts is frictional, as in the ordinary knife switches, and the friction between the parts is sufficient to keep them from being separated by the spring 46 until the driver, remounting on the seat, causes the link 31 to be moved upwardly, thus positively separating the arm 29 from the contact 45.

On the under side of the floor board of the tractor is a box in which the switch 17a is mounted. Extending through the floor board 32 is an actuator 33 for the lever 34 mounted in the box 35. This lever is turned about its pivot by a spring 36 which forcibly opens the switch 17a. This lever carries a bridging element 37 which bridges the gap between the terminals 38 and 39, to which the wires 40 and 41 are connected. Hence, when the operator presses the actuator 33 downwardly, the circuit is closed through the wires 40 and 41 closing the circuit between the coil 16 and the timer 13. A use for the switch 17a is to be able to keep the motor running while the tractor is standing still or the operator is standing up on the tractor and the latter is running. To accomplish either of these, the driver merely puts a foot on the actuator 33 and presses, thus closing the switch 17a, which is opened by the spring 36 when the driver lifts his foot from the actuator 33.

Figure 2:
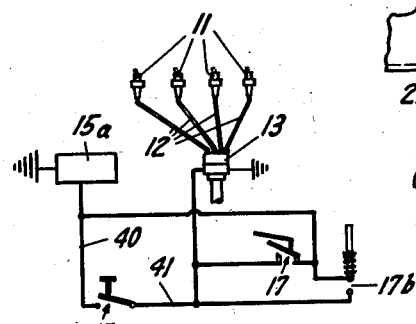
Fig. 2 shows schematically the wiring diagram of a tractor having a magneto type of generator.
Figure 2A:
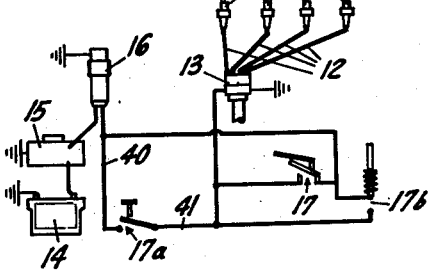
Fig. 2A represents a similar wiring system provided with a non-magneto type of current generator.

The foregoing description is particularly pertinent to the structure of Fig. 2A, while it is applicable, in part, to the structure of Fig. 2. The power unit 15 of Fig. 2A is of the rotary generator type, while that in Fig. 2 is of the magneto type. In the structure of Fig. 2, the magneto 15a replaces the battery 14, the generator 15, and the coil 16, but the circuit is otherwise the same. The present improvement is in the power distribution system which provides for the automatic stoppage of the motor in event the operator, purposely or accidentally, leaves the tractor, but it is primarily designed for such emergencies as the operator falling or being thrown from the tractor. The difference in structure between Figs. 2 and 2A is merely one of adaptation to the particular type of electrical power unit used.

This invention is essentially in the provision of various circuit breakers which cooperate under certain circumstances in the breaking of the electric circuit to the spark plugs. It is desired to emphasize that when the magneto is used there is no need for a battery or generator and, conversely, when a battery and generator are used, there is no need for a magneto. With either arrangement, the combination of the controlling switches will function the same in stopping the motor.

It is of course understood that the specific description of structure set forth above may be departed from without departing from the spirit of this invention as disclosed herein and as defined in the appended claims.

Having now described my invention, I claim:

1. A safety device for a tractor having a seat and a spring supporting the same, said device comprising a support adapted to be mounted on the tractor under said seat and spring, a lever pivoted in an approximately horizontal position in the lower portion of said support and carrying a contact at one end, an approximately vertically shiftable plunger carried by said support and having a contact at its lower end, said plunger being reciprocable toward and from the lever and the contact carried thereby and engageable with the contact before the plunger is moved to its limit, a spring reacting against said support for urging said plunger upwardly, an approximately vertically extending link connected at its lower end to the other end of said lever, and a manually operable switch carried by said support above said lever and including a switch arm in a position to be engaged by said link when the switch arm is in switch closing position, whereby, when downward movement of said plunger, as by the operator mounting said seat, acts through said lever to raise said link, the upper end of the latter engages said switch arm and shifts it from one position to another.

2. A safety device as defined by claim 1, further characterized by means connected with said switch arm for yieldably holding the arm separated from its associated contact unless the arm is positively moved into engagement with said contact.

3. A safety device as defined by claim 1, further characterized by a lever pivotally mounted on the rear portion of said support and connected at its inner end with said switch arm for shifting the latter manually into engagement with an associated contact.

JAMES A. MORRISON.

REFERENCES CITED

The following references are of record in the file of this patent:

UNITED STATES PATENTS

| Number | Name | Date |
| --- | --- | --- |
| 1,748,705 | Dodson | Feb. 25, 1930 |
| 1,956,978 | Nafziger | May 1, 1934 |
| 2,250,754 | Dooley | July 29, 1941 |